(12) United States Patent
Palat et al.

(10) Patent No.: US 10,959,292 B2
(45) Date of Patent: Mar. 23, 2021

(54) METHODS TO INDICATE A VERSION OF PACKET DATA CONVERGENCE PROTOCOL (PDCP) IN DUAL CONNECTIVITY ARRANGEMENTS

(71) Applicant: Intel Corporation, Santa Clara, CA (US)

(72) Inventors: Sudeep K. Palat, Cheltenham (GB); Seau S. Lim, Swindon (GB); Yi Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/868,924

(22) Filed: May 7, 2020

(65) Prior Publication Data

US 2020/0305230 A1 Sep. 24, 2020

Related U.S. Application Data

(63) Continuation of application No. 16/273,728, filed on Feb. 12, 2019, now Pat. No. 10,820,373.

(Continued)

(51) Int. Cl.
*H04W 88/06* (2009.01)
*H04W 76/10* (2018.01)
(Continued)

(52) U.S. Cl.
CPC ............ *H04W 88/06* (2013.01); *H04W 48/16* (2013.01); *H04W 48/20* (2013.01); *H04W 76/10* (2018.02); *H04W 80/02* (2013.01)

(58) Field of Classification Search
CPC ...... H04W 76/00; H04W 76/10; H04W 76/11; H04W 76/27; H04W 80/02; H04W 80/06;
(Continued)

(56) References Cited

U.S. PATENT DOCUMENTS 10,820,373 B2 * 10/2020 Palat .................... H04W 76/10
2012/0063370 A1    3/2012 Worrall
(Continued)

OTHER PUBLICATIONS

U.S. Appl. No. 16/273,728, filed Feb. 12, 2019, Methods to Indicate a Version of Packet Data Convergence Protocol (PDCP) in Dual Connectivity Arrangements.
(Continued)

*Primary Examiner* — Kevin C. Harper
(74) *Attorney, Agent, or Firm* — Schwegman Lundberg & Woessner, P. A.

(57) ABSTRACT

Embodiments of a User Equipment (UE), Evolved Node-B (eNB) and methods of communication are generally described herein. The UE may receive a SystemInformationBlockType1 from an eNB. The UE may determine that the eNB supports Fifth Generation Core (5GC) operation if the SystemInformationBlockType1 message includes a plmn-Identity-5GC-r15 parameter. The UE may transmit a radio resource control (RRC) connection request message to establish an RRC connection. If it is determined that the eNB supports 5GC operation, and if the UE supports 5GC operation, the UE may encode the RRC connection request message in accordance with a default new radio packet data convergence protocol (NR PDCP) configuration; and may use NR PDCP for one or more subsequent messages.

20 Claims, 12 Drawing Sheets

Related U.S. Application Data

(60) Provisional application No. 62/631,086, filed on Feb. 15, 2018.

(51) Int. Cl.
  *H04W 48/20* (2009.01)
  *H04W 80/02* (2009.01)
  *H04W 48/16* (2009.01)

(58) Field of Classification Search
  CPC ... H04W 80/08; H04W 88/06; H04W 88/023; H04W 48/16; H04W 48/20; H04W 84/042
  See application file for complete search history.

(56) References Cited

U.S. PATENT DOCUMENTS

| | | |
|---|---|---|
| 2012/0302196 A1 | 11/2012 | Chin et al. |
| 2013/0137469 A1 | 5/2013 | Schmidt et al. |
| 2014/0098761 A1 | 4/2014 | Lee et al. |
| 2015/0223155 A1 | 8/2015 | Turtinen et al. |
| 2016/0241685 A1 | 8/2016 | Shah et al. |
| 2017/0055176 A1 | 2/2017 | Xiao et al. |
| 2018/0199315 A1 | 7/2018 | Hong et al. |
| 2018/0270679 A1 | 9/2018 | Laselva et al. |
| 2019/0037635 A1 | 1/2019 | Guo et al. |
| 2019/0053175 A1 | 2/2019 | Kubota et al. |
| 2019/0150037 A1 | 5/2019 | Mildh et al. |
| 2019/0174576 A1 | 6/2019 | Palat et al. |
| 2019/0261264 A1 | 8/2019 | Lou et al. |
| 2019/0306764 A1 | 10/2019 | Da Silva et al. |
| 2019/0335523 A1* | 10/2019 | Wu .............. H04W 76/11 |
| 2020/0229259 A1* | 7/2020 | Teyeb .............. H04W 76/15 |

OTHER PUBLICATIONS

"U.S. Appl. No. 16/273,728, Non Final Office Action dated Mar. 17, 2020", 32 pgs.

"U.S. Appl. No. 16/273,728, Response filed Mar. 27, 2020 to Non Final Office Action dated Mar. 17, 2020", 15 pgs.

* cited by examiner

METHODS TO INDICATE A VERSION OF PACKET DATA CONVERGENCE PROTOCOL (PDCP) IN DUAL CONNECTIVITY ARRANGEMENTS

PRIORITY CLAIM

This application is a continuation of U.S. patent application Ser. No. 16/273,728, filed Feb. 12, 2019, which claims priority under 35 USC 119(e) to U.S. Provisional Patent Application Ser. No. 62/631,086, filed Feb. 15, 2018 each of which is incorporated herein by reference in its entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to dual connectivity arrangements, including Evolved Universal Terrestrial Radio Access (E-UTRA) new radio (NR) dual connectivity (EN-DC) arrangements.

BACKGROUND

Base stations and mobile devices operating in a cellular network may exchange data. As demand for mobile services and high data rates increases, various challenges related to reliability and capacity may arise. In an example scenario, a large number of users may demand access to the network. In another example scenario, the base stations and/or mobile devices may communicate in accordance with a dual connectivity technique. Various techniques used in these and other scenarios may become challenging, including exchanging of control information and/or performance information between the base stations and mobile devices. Accordingly, there is a general need for methods to enable such techniques in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
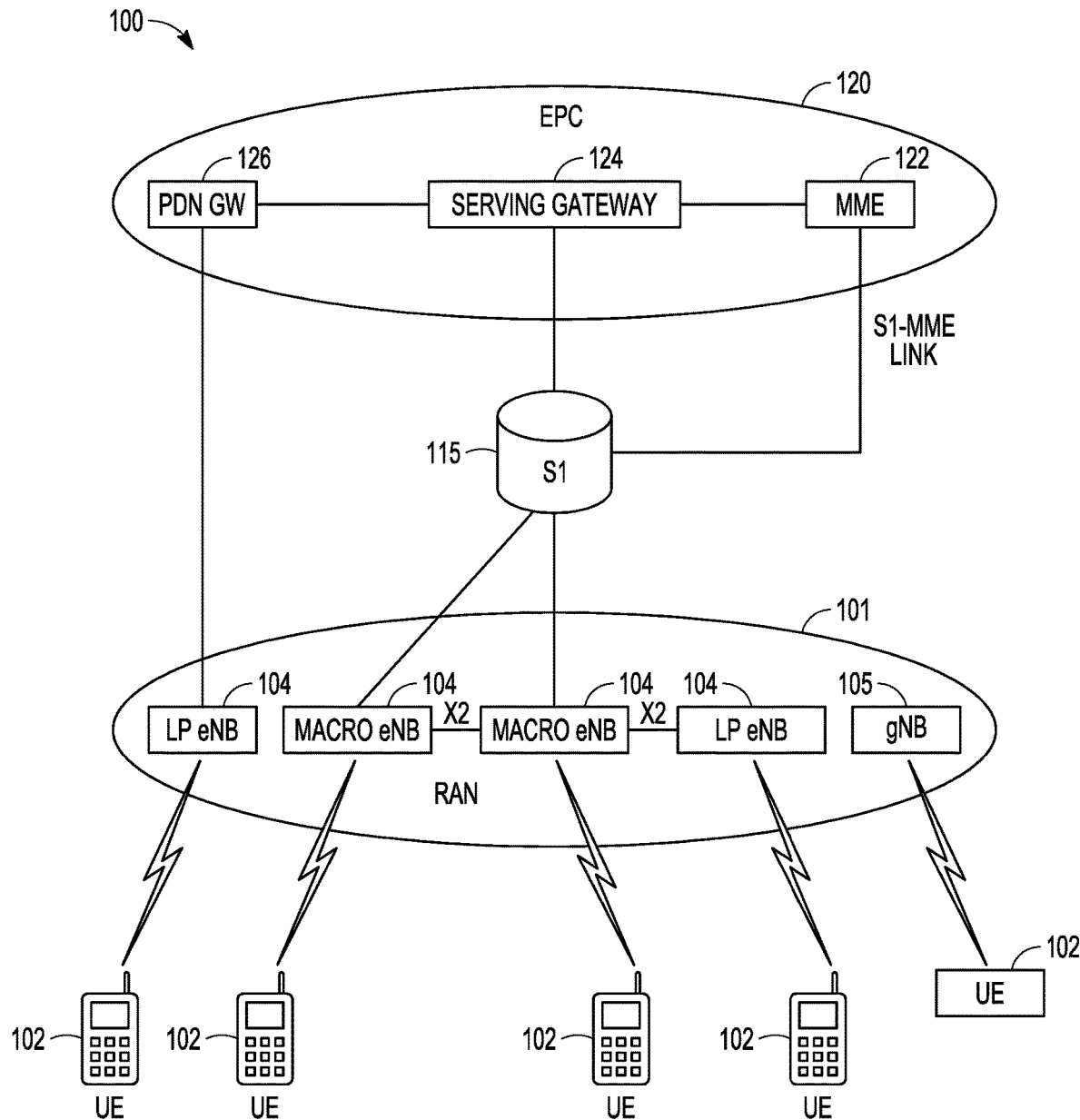
FIG. 1A is a functional diagram of an example network in accordance with some embodiments.
Figure 1B:
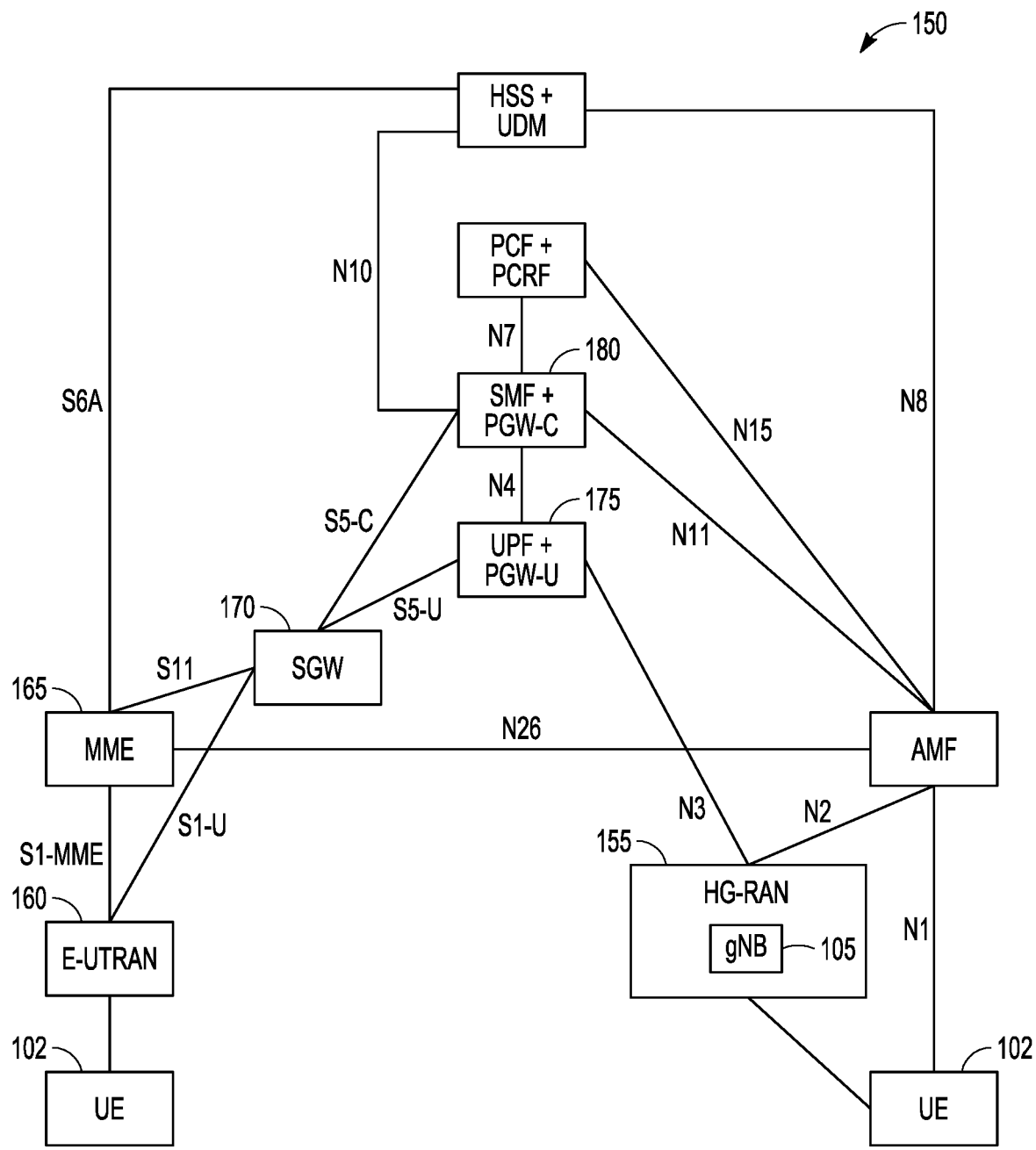
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
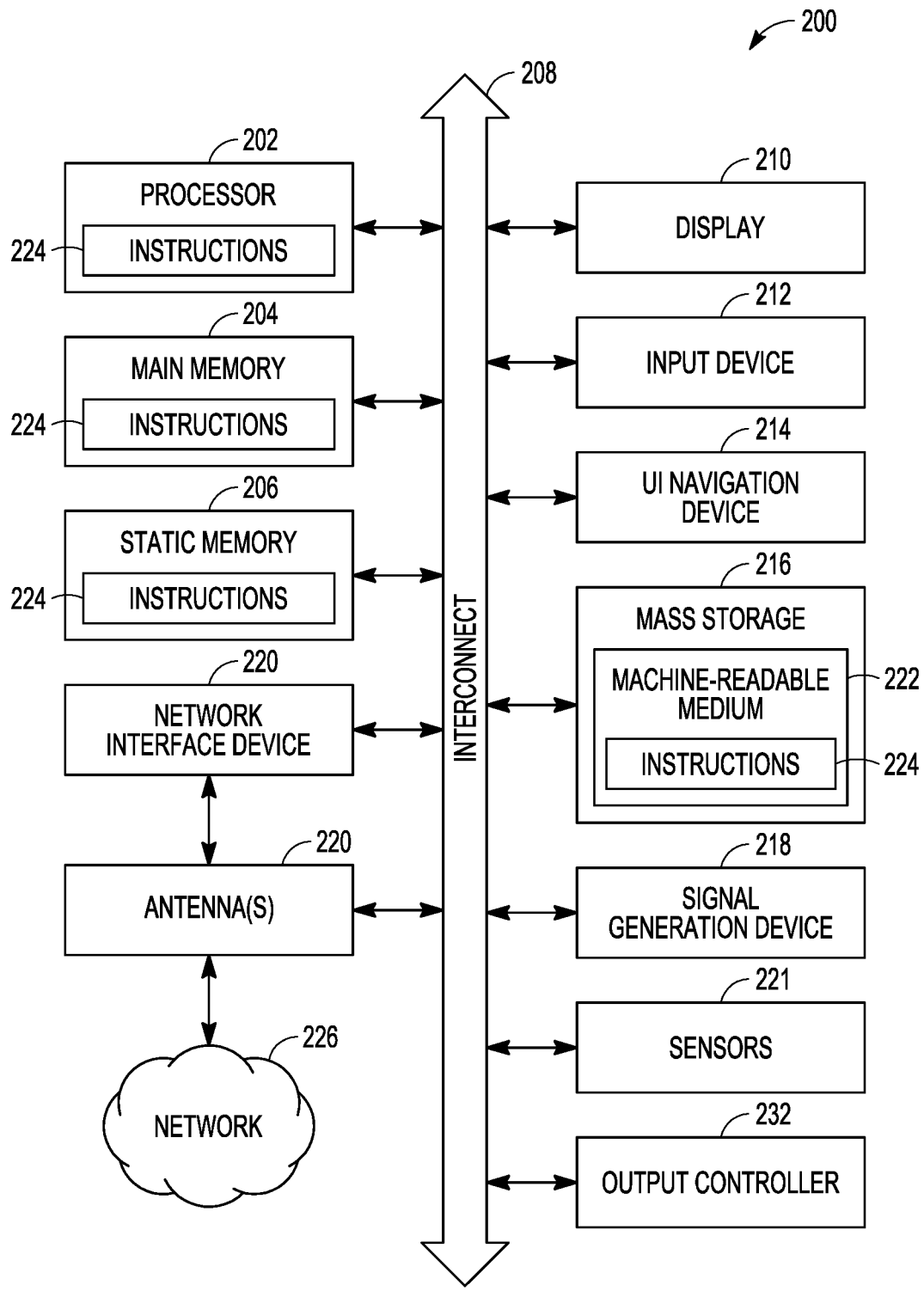
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
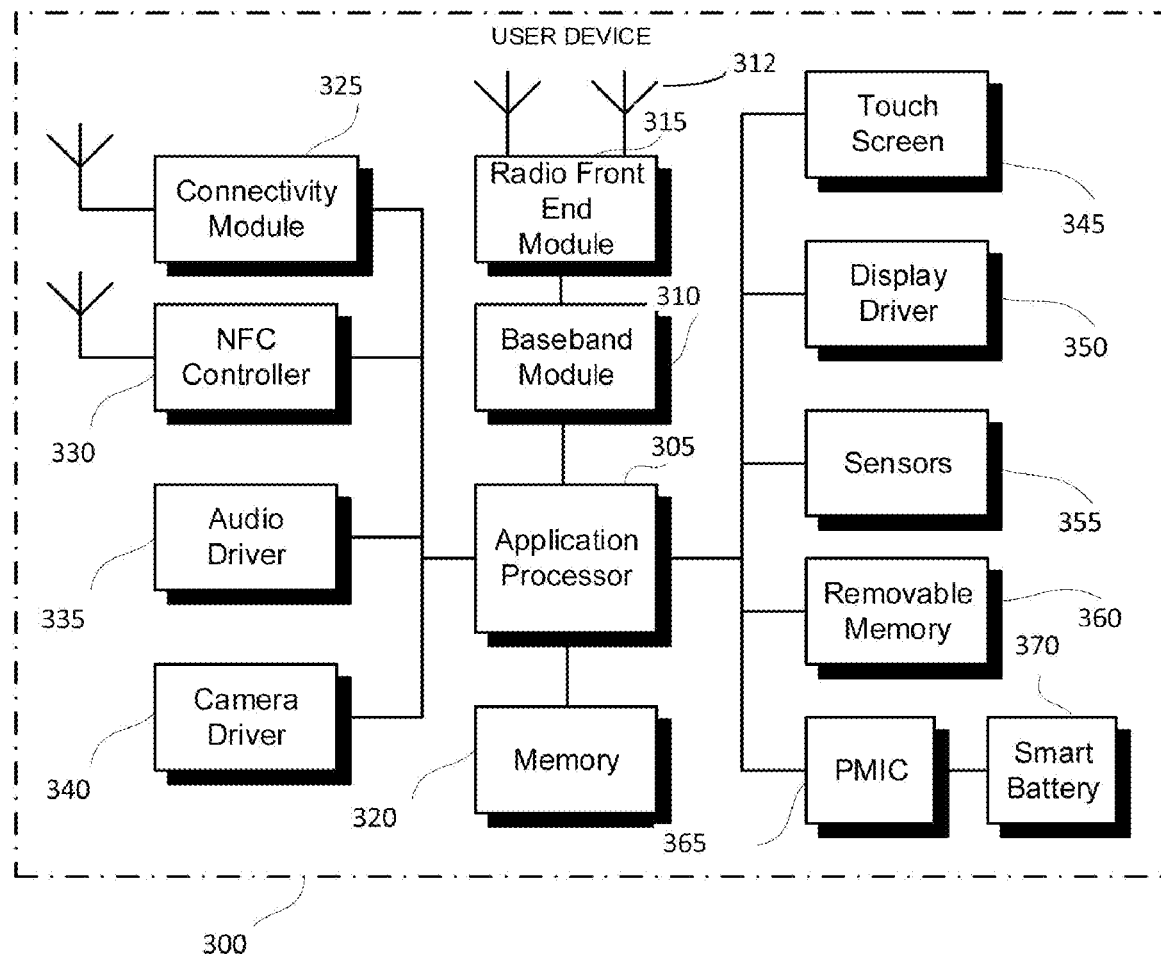
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
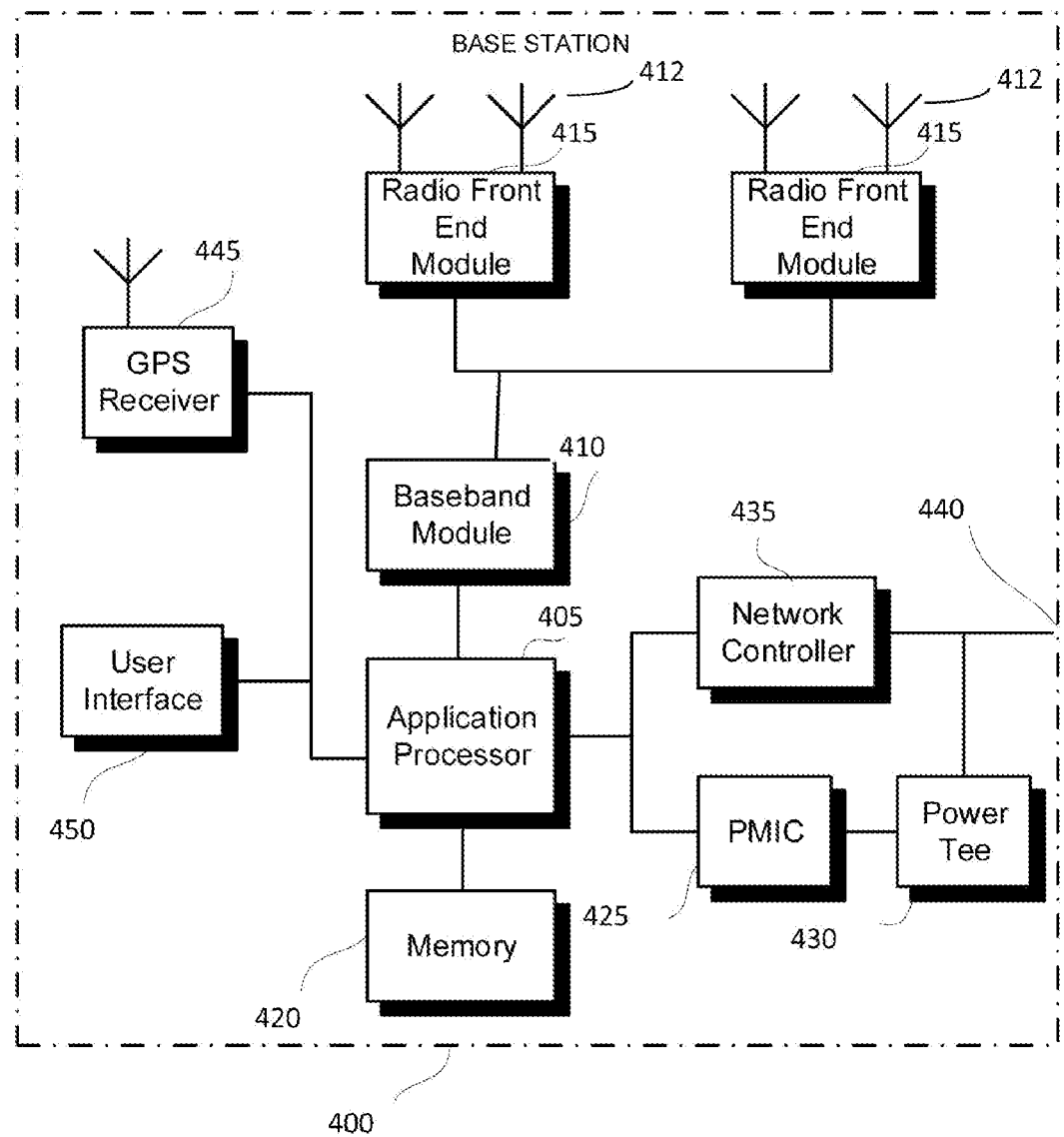
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
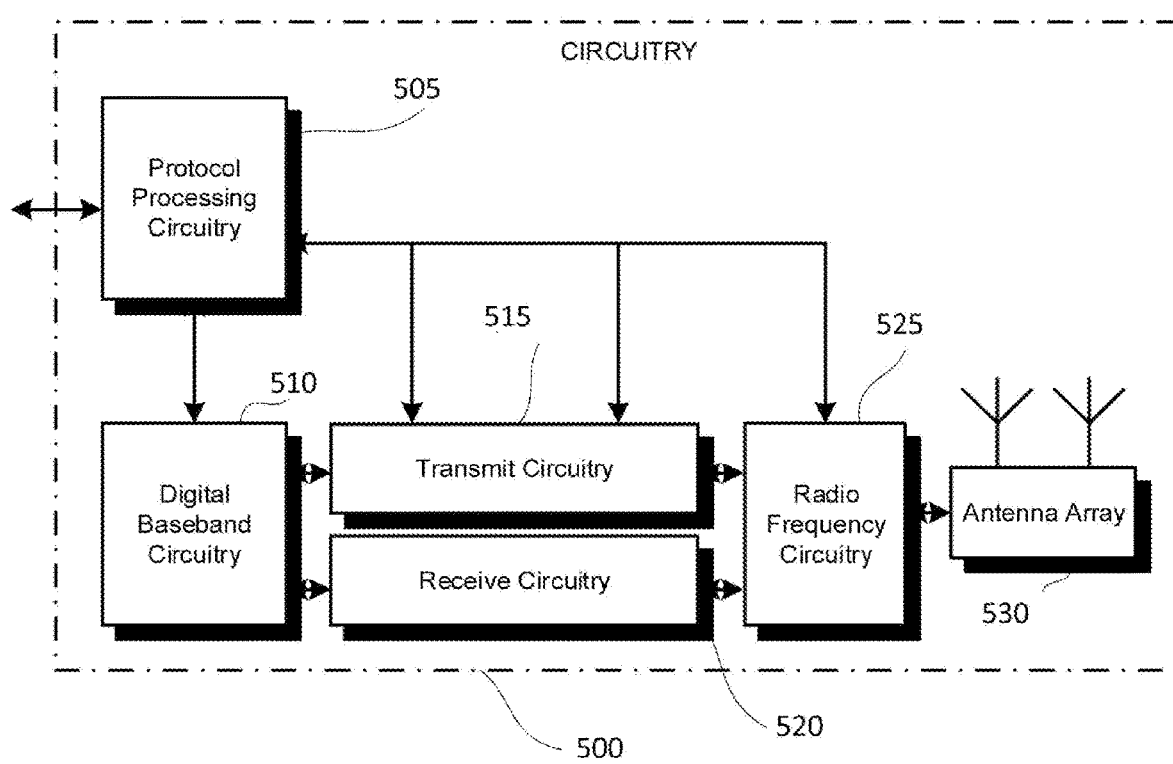
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, a UE 102 may receive a SystemInformationBlockType1 message that includes system information related to cell access and defines scheduling of other system information. The SystemInformationBlockType1 message may be received from an eNB 104 either via broadcast or dedicated signaling. The UE 102 may determine that the eNB 104 supports Fifth Generation Core (5GC) operation if the SystemInformationBlockType1 message includes a plmn-Identity-5GC-r15 parameter. The UE 102 may transmit a radio resource control (RRC) connection request message to establish an RRC connection. Establishment of the RRC connection may include establishment of a signaling radio bearer 1 (SRB1).

If it is determined that the eNB 104 supports 5GC operation, and if the UE 102 supports 5GC operation, the UE 102 may: use new radio packet data convergence protocol (NR PDCP) to decode one or more subsequent messages received on the SRB1; and use NR PDCP to encode one or more subsequent messages transmitted on the SRB1. These embodiments are described in more detail below.

Figure 6:
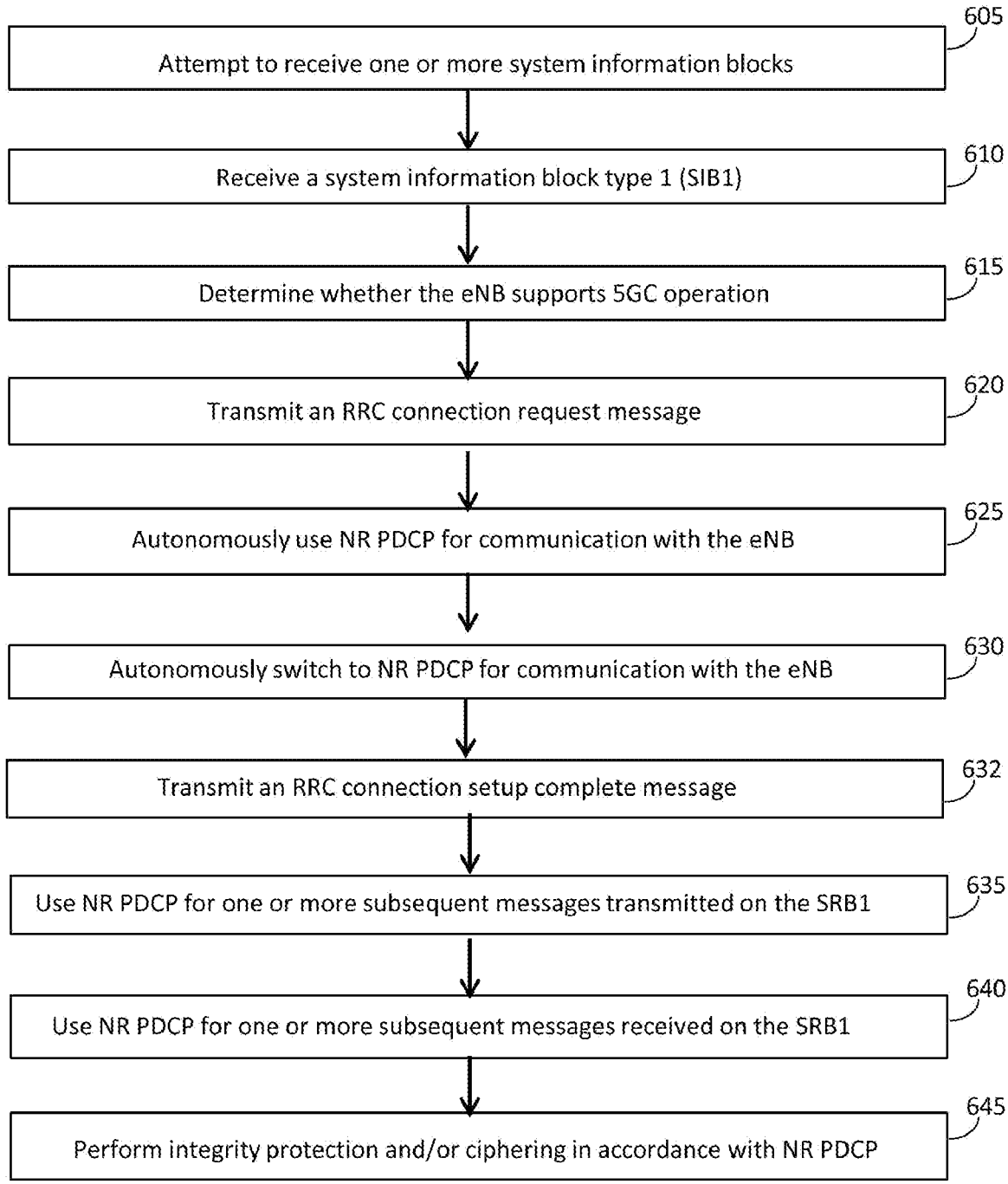
FIG. 6 illustrates the operation of a method of communication in accordance with some embodiments.
Figure 7:
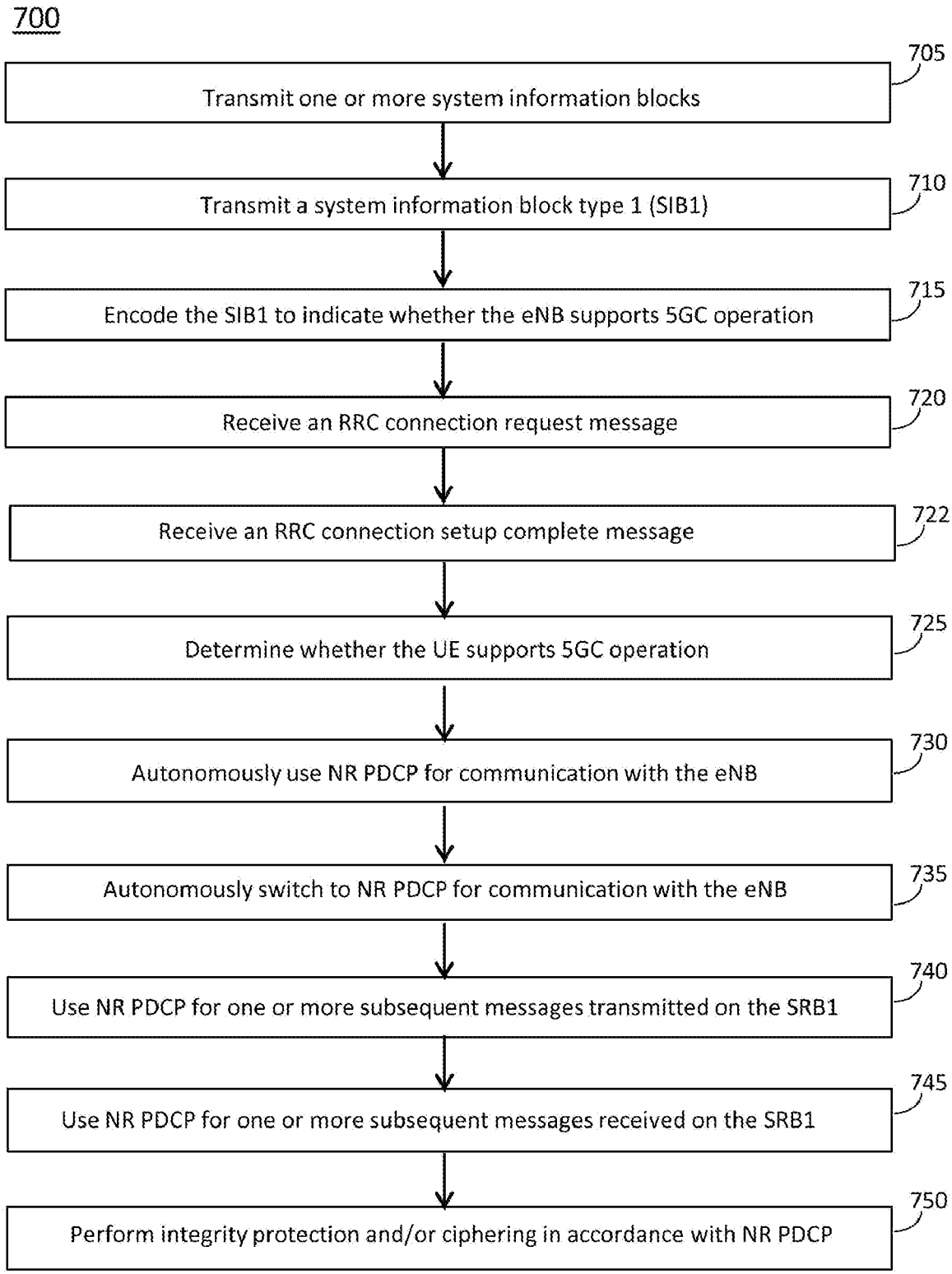
FIG. 7 illustrates the operation of another method of communication in accordance with some embodiments.

FIG. 6 illustrates the operation of a method of communication in accordance with some embodiments. FIG. 7 illustrates the operation of another method of communication in accordance with some embodiments. It is important to note that embodiments of the methods 600, 700 may include additional or even fewer operations or processes in comparison to what is illustrated in FIGS. 6-7. In addition, embodiments of the methods 600, 700 are not necessarily limited to the chronological order that is shown in FIGS. 6-7. In describing the methods 600, 700, reference may be made to one or more figures, although it is understood that the methods 600, 700 may be practiced with any other suitable systems, interfaces and components.

In some embodiments, a UE 102 may perform one or more operations of the method 600, but embodiments are not limited to performance of the method 600 and/or operations of it by the UE 102. In some embodiments, another device and/or component may perform one or more operations of the method 600. In some embodiments, another device and/or component may perform one or more operations that may be similar to one or more operations of the method 600. In some embodiments, another device and/or component may perform one or more operations that may be reciprocal to one or more operations of the method 600. In a non-limiting example, the eNB 104 may perform an operation that may be the same as, similar to, reciprocal to and/or related to an operation of the method 600, in some embodiments.

In some embodiments, an eNB 104 may perform one or more operations of the method 700, but embodiments are not limited to performance of the method 700 and/or operations of it by the eNB 104. In some embodiments, another device and/or component may perform one or more operations of the method 700. In some embodiments, another device and/or component may perform one or more operations that may be similar to one or more operations of the method 700. In some embodiments, another device and/or component may perform one or more operations that may be reciprocal to one or more operations of the method 700. In a non-limiting example, the UE 102 may perform an operation that may be the same as, similar to, reciprocal to and/or related to an operation of the method 700, in some embodiments. In another non-limiting example, the gNB 105 may perform an operation that may be the same as, similar to, reciprocal to and/or related to an operation of the method 700, in some embodiments.

It should be noted that one or more operations of one of the methods 600, 700 may be the same as, similar to and/or reciprocal to one or more operations of the other method. For instance, an operation of the method 600 may be the same as, similar to and/or reciprocal to an operation of the method 700, in some embodiments. In a non-limiting example, an operation of the method 600 may include reception of an element (such as a frame, block, message and/or other) by the UE 102, and an operation of the method 700 may include transmission of a same element (and/or similar element) by the eNB 104. In some cases, descriptions of operations and techniques described as part of one of the methods 600, 700 may be relevant to the other method.

Discussion of various techniques and concepts regarding one of the methods 600, 700 and/or other method may be applicable to one of the other methods, although the scope of embodiments is not limited in this respect. Such technique and concepts may include system information blocks, system information block messages, RRC signaling, SRBs, PDCP, NR PDCP, and/or other.

The methods 600, 700 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 600, 700 and other methods described herein may be practiced by wireless devices configured to operate in other suitable types of wireless communication systems, including systems configured to operate according to various IEEE standards such as IEEE 802.11. The methods 600, 700 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the UE 102 may be configurable to support Fifth Generation Core (5GC) operation and Long Term Evolution (LTE) operation in accordance with Evolved Universal Terrestrial Radio Access (E-UTRA) new radio (NR) dual connectivity (EN-DC). The scope of embodiments is not limited in this respect, however, as one or more of the techniques, operations and/or methods described herein may be performed by a UE 102 that may not necessarily be configured as such.

In some embodiments, the eNB 104 may be configurable to support 5GC operation and LTE operation in accordance with EN-DC. The scope of embodiments is not limited in this respect, however, as one or more of the techniques, operations and/or methods described herein may be performed by an eNB 104 that may not necessarily be configured as such.

At operation 605, the UE 102 may attempt to receive one or more system information blocks. At operation 610, the UE 102 may receive a system information block type 1 (SIB1).

In some embodiments, the UE 102 may receive a SystemInformationBlockType1 message. In some embodiments, the SystemInformationBlockType1 message may include system information, including but not limited to system information related to cell access. In some embodiments, the SystemInformationBlockType1 message may define scheduling of other system information. In some embodiments, the SystemInformationBlockType1 message may be received from the eNB 104, although the scope of embodiments is not limited in this respect. In some embodiments, the SystemInformationBlockType1 message may be received from the eNB 104 via broadcast. In some embodiments, the SystemInformationBlockType1 message may be received from the eNB 104 either via broadcast or dedicated signaling.

In some embodiments, the UE 102 may attempt to receive the SystemInformationBlockType1 message in accordance with a fixed schedule and/or repetitions. In a non-limiting example, the UE 102 may attempt to receive the SystemInformationBlockType1 message in accordance with a fixed schedule with a periodicity of 80 milliseconds (msec) and repetitions made within 80 msec. Embodiments are not limited to usage of the value 80 msec, as other values may be used.

At operation 615, the UE 102 may determine whether the eNB 104 supports Fifth Generation Core (5GC) operation.

In some embodiments, the UE 102 may determine that the eNB 104 supports 5GC operation if the SystemInformationBlockType1 message includes a plmn-Identity-5GC-r15 parameter. In some embodiments, the UE 102 may determine that the eNB 104 does not support 5GC operation if the SystemInformationBlockType1 message does not include the plmn-Identity-5GC-r15 parameter. The scope of embodiments is not limited to usage of this particular parameter to determine if the eNB 104 supports 5GC operation, however. Other parameters (including but not limited to other parameters in the SystemInformationBlockType1 message) may be used, in some embodiments.

In some embodiments, the plmn-Identity-5GC-r15 parameter may indicate an identifier of a public land mobile network (PLMN) for 5GC.

At operation 620, the UE 102 may transmit a radio resource control (RRC) connection request message. In some embodiments, the UE 102 may transmit the RRC connection request message to the eNB 104, although the scope of embodiments is not limited in this respect.

In some embodiments, the UE 102 may transmit the RRC connection request message to establish an RRC connection. In some embodiments, establishment of the RRC connection may include establishment of a signaling radio bearer 1 (SRB1). In some embodiments, the SRB1 may be established for transmission of RRC messages and non-access stratum (NAS) messages.

In some embodiments, if it is determined that the eNB 104 supports 5GC operation, and if the UE 102 supports 5GC operation: the UE 102 may apply a default new radio packet data convergence protocol (NR PDCP) configuration. In a non-limiting example, the default NR PDCP configuration may include a t-reordering timer. One or more other parameters and/or information may be included in the default NR PDCP configuration, in some embodiments.

In some embodiments, if it is determined that the eNB 104 supports 5GC operation, and if the UE 102 supports 5GC operation: the UE 102 may use NR PDCP in accordance with the default NR PDCP configuration. In some embodiments, the UE 102 may, if it is determined that the eNB 104 supports 5GC operation, and if the UE 102 supports 5GC operation: apply a default NR PDCP configuration to perform one or more NR PDCP operations.

In some embodiments, if it is determined that the eNB 104 does not support 5GC operation: the UE 102 may encode one or more RRC messages in accordance with a Long Term Evolution (LTE) PDCP configuration for the SRB1.

At operation 625, the UE 102 may autonomously use NR PDCP for communication with the eNB 104. At operation 630, the UE 102 may autonomously switch to NR PDCP for communication with the eNB 104. At operation 632, the UE 102 may transmit an RRC connection setup complete message.

In some embodiments, the UE 102 may, if it is determined that the eNB 104 supports 5GC operation, and if the UE 102 supports 5GC operation: autonomously use NR PDCP for communication with the eNB 104 on the SRB1. In some embodiments, the UE 102 may indicate whether the UE 102 supports 5GC operation in the RRC connection setup complete message. In some embodiments, the UE 102 may, if it is determined that the eNB 104 supports 5GC operation, and if the UE 102 supports 5GC operation: autonomously use NR PDCP for communication with the eNB 104 on a data radio bearer (DRB). In some embodiments, the NR PDCP may include packet duplication for packets sent on the DRB.

In some embodiments, the UE 102 may, it is determined that the eNB 104 supports 5GC operation, and if the UE 102 supports 5GC operation: encode an RRC connection setup complete message that indicates that the UE 102 supports 5GC operation.

At operation 635, the UE 102 may use NR PDCP for one or more subsequent messages transmitted on the SRB1. At operation 640, the UE 102 may use NR PDCP for one or more subsequent messages received on the SRB1. At operation 645, the UE 102 may perform integrity protection and/or ciphering in accordance with NR PDCP.

In some embodiments, if it is determined that the eNB 104 supports 5GC operation, and if the UE 102 supports 5GC operation, the UE 102 may: use NR PDCP to decode one or more subsequent messages received on the SRB1; and/or use NR PDCP to encode one or more subsequent messages transmitted on the SRB1.

In some embodiments, if it is determined that the eNB 104 supports 5GC operation, and if the UE 102 supports 5GC operation, the UE 102 may use NR PDCP for all subsequent messages received and sent on the SRB1. In some embodiments, if it is determined that the eNB 104 supports 5GC operation, and if the UE 102 supports 5GC operation, the UE 102 may use NR PDCP (in accordance with a default NR PDCP configuration) for all subsequent messages received and sent on the SRB1.

In some embodiments, if it is determined that the eNB 104 supports 5GC operation, and if the UE 102 supports 5GC operation, the UE 102 may perform integrity protection and ciphering, in accordance with the NR PDCP, on all RRC messages that are encoded for transmission on the SIB1. In some embodiments, if it is determined that the eNB 104 supports 5GC operation, and if the UE 102 supports 5GC operation, the UE 102 may perform integrity protection and ciphering, in accordance with the NR PDCP, on one or more RRC messages that are encoded for transmission on the SIB1.

In some embodiments, the RRC connection request message may be encoded for transmission on a signaling radio bearer 0 (SRB0). Accordingly, the RRC connection request message is not sent on the SRB1 in some embodiments. In addition, the RRC connection request message is not encoded in accordance with PDCP (NR PDCP, LTE PDCP or other), in some embodiments.

In some embodiments, if it is determined that the eNB 104 supports 5GC operation, and if the UE 102 supports 5GC operation, the UE 102 may set a ue-Identity in the RRC connection request message as: if upper layers provide a 5G-S-TMSI (temporary mobile subscriber identity), set the ue-Identity to ng-5G-S-TMSI-Part1; else, select a random value in a predetermined range and set the ue-Identity to the random value. In some embodiments, if it is determined that the eNB 104 supports 5GC operation, and if the UE 102 supports 5GC operation, the UE 102 may set an establishmentCause in the RRC connection request message in accordance with information received from upper layers.

In some embodiments, an apparatus of a UE 102 may comprise memory. The memory may be configurable to store information related to a SystemInformationBlockType1 message. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to decoding the SystemInformationBlockType1 message. The apparatus may include a transceiver to receive the SystemInformationBlockType1 message. The transceiver may transmit and/or receive other blocks, messages and/or other elements.

At operation 705, the eNB 104 may transmit one or more system information blocks. At operation 710, the eNB 104 may transmit a SIB1. At operation 715, the eNB 104 may encode the SIB1 to indicate whether the eNB 104 supports 5GC operation.

In some embodiments, the eNB 104 may encode a SystemInformationBlockType1 message to include a plmn-Identity-5GC-r15 parameter to indicate that the eNB 104 supports 5GC operation. In some embodiments, the plmn-Identity-5GC-r15 parameter may indicate an identifier of a public land mobile network (PLMN) for 5GC. The scope of embodiments is not limited to usage of this particular parameter to indicate that the eNB 104 supports 5GC operation, however. Other parameters (including but not limited to other parameters in the SystemInformationBlockType1 message) may be used, in some embodiments.

In some embodiments, the eNB 104 may encode the SystemInformationBlockType1 message for transmission via broadcast. In some embodiments, the eNB 104 may encode the SystemInformationBlockType1 message for transmission via broadcast or dedicated signaling. In some embodiments, the eNB 104 may encode the SystemInformationBlockType1 message to include system information related to cell access. In some embodiments, the eNB 104 may encode the SystemInformationBlockType1 message to define scheduling of other system information.

In some embodiments, the eNB 104 may transmit the SystemInformationBlockType1 message in accordance with a fixed schedule and/or repetitions. In a non-limiting example, the eNB 104 may transmit the SystemInformationBlockType1 message in accordance with a fixed schedule with a periodicity of 80 milliseconds (msec) and repetitions made within 80 msec. Embodiments are not limited to usage of the value 80 msec, as other values may be used.

At operation 720, the eNB 104 may receive an RRC connection request message. At operation 722, the eNB 104 may receive an RRC connection setup complete message.

At operation 725, the eNB 104 may determine whether the UE 102 supports 5GC operation. In some embodiments, the eNB 104 may determine that the UE 102 supports 5GC operation based on an indicator in the RRC connection setup complete message. In a non-limiting example, the indicator may indicate whether or not the UE supports NR PDCP. In another non-limiting example, the indicator may indicate whether or not the UE has switched to NR PDCP. In a non-limiting example, the indicator may indicate whether the UE supports NR PDCP or LTE PDCP. Embodiments are not limited to these examples, however, as the UE 102 may use other technique to indicate to the eNB 104 that the UE 102 supports 5GC operation.

In some embodiments, the eNB 104 may determine that the UE 102 supports 5GC operation based on an indicator in the RRC connection request message. In such embodiments, operation 722 may occur after operation 735 below. It should be noted that embodiments are not limited to the chronological ordering shown in FIG. 7. In some embodiments, the UE 102 may transmit an RRC connection request that indicates that the UE 102 supports 5GC operation. It should be noted that in such cases, the RRC connection setup complete message may use NR PDCP.

In some embodiments, the eNB 104 may determine that the UE 102 supports 5GC operation based on an indicator in a random access channel (RACH) preamble. In some embodiments, the UE 102 may transmit a RACH preamble that indicates that the UE 102 supports 5GC operation. It should be noted that in such cases, the RRC connection setup complete message may use NR PDCP.

At operation 730, the eNB 104 may autonomously use NR PDCP for communication with the UE 102. At operation 735, the eNB 104 may autonomously switch to NR PDCP for communication with the UE 102. At operation 740, the eNB 104 may use NR PDCP for one or more subsequent messages transmitted on the SRB1. At operation 745, the eNB 104 may use NR PDCP for one or more subsequent messages received on the SRB1. At operation 750, the eNB 104 may perform integrity protection and/or ciphering in accordance with NR PDCP.

In some embodiments, the eNB 104 may, if it is determined that the UE 102 supports 5GC operation: use NR PDCP to decode one or more subsequent messages received from the UE 102 on the SRB1; and/or use NR PDCP to encode one or more subsequent messages transmitted to the UE 102 on the SRB1. In some embodiments, the eNB 104 may, if it is determined that the UE 102 supports 5GC operation: use NR PDCP for all subsequent messages received and sent on the SRB1.

In some embodiments, NR PDCP may include integrity protection and ciphering. In some embodiments, if it is determined that the UE 102 supports 5GC operation, the eNB 104 may use NR PDCP for all subsequent messages received and sent on the SRB1. In some embodiments, if it is determined that the UE 102 supports 5GC operation, the eNB 104 may use NR PDCP for one or more subsequent messages received and sent on the SRB1. In some embodiments, if it is determined that the UE 102 supports 5GC operation, the eNB 104 may perform integrity protection and ciphering, in accordance with the NR PDCP, on all RRC messages that are encoded for transmission on the SIB1. In some embodiments, if it is determined that the UE 102 supports 5GC operation, the eNB 104 may perform integrity protection and ciphering, in accordance with the NR PDCP, on one or more RRC messages that are encoded for transmission on the SIB1.

In some embodiments, an apparatus of an eNB 104 may comprise memory. The memory may be configurable to store information related to the SystemInformationBlockType1 message. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to encoding the SystemInformationBlockType1 message. The apparatus may include a transceiver to transmit the SystemInformationBlockType1 message. The transceiver may transmit and/or receive other blocks, messages and/or other element.

FIGS. 8-11 illustrate example operations and elements that may be exchanged in accordance with some embodiments. It should be noted that the examples shown in FIGS. 8-11 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 8-11. Although some of the elements shown in the examples of FIGS. 8-11 may be included in a 3GPP LTE standard, 5G standard, NR standard and/or other standard, embodiments are not limited to usage of such elements that are included in standards.

In some embodiments, EN-DC may require UEs 102 to be configured with NR PDCP to use split bearers. During Connection setup procedure, the network may not necessarily have the UE capability and hence it may not be possible to configure the UE 102 with NR PDCP for SRB1. The UE 102 may not necessarily know the network capability and hence may not autonomously use NR PDCP. Hence the UE 102 may be initially configured with LTE PDCP and then reconfigured with NR PDCP later on. In some cases, the network may reconfigure the UE 102 to NR PDCP. This double reconfiguration may result in extra signaling and/or additional delay, in some cases. There also may be confusion on which PDCP version the UE 102 is using if the UE 102 sends any UL messages before the UE 102 is reconfigured to NR PDCP.

In some embodiments, the UE 102 may be provided with an indication to use NR PDCP, if supported, in msg 4 or in RAR or by broadcast. If the UE 102 supports NR PDCP, the UE 102 may provide an indication in msg 5 that it will switch to NR PDCP. If the decision is to switch to NR PDCP, the UE 102 may do this immediately after sending message 5. The network, on receipt of msg 5, may update its configuration to NR PDCP (if set by the UE 102 in msg 4) and may use it for subsequent UL and DL messages. In some cases, such a technique may result in no additional signaling or delay in switching to NR PDCP and may speed up a connection setup.

In some embodiments, for the SRB1, the eNB 104 may not necessarily know UE capability, including but not limited to UE capability related to whether the UE 102 supports EN-DC at the point when the SRB1 is established during RRC connection setup (since UE capability may only be known after the SRB1 is established, in some embodiments).

In order for the eNB 104 to know the UE capability for EN-DC, one option is for the UE 104 to provide its PDCP capability in Msg3. But message 3 is size limited and may not necessarily be able to carry this information.

In some embodiments, an alternative is to set SRB1 up as LTE PDCP and change it to NR PDCP later (such as when it needs to be reconfigured to split SRB1, although the scope of embodiments is not limited in this respect).

In some embodiments, for both MCG DRB and MCG SRB1, the default mechanism for reconfiguration from LTE PDCP to NR PDCP may be usage of handover (using intra-cell HO or during inter-cell HO). However, performing a handover procedure for changing LTE PDCP to NR PDCP may result in unnecessary interruption, particularly for DRB, in some cases.

In some embodiments (which may be referred to herein without limitation as "Option 1"), PDCP may always be configured as NR PDCP. In some embodiments (which may be referred to herein without limitation as "Option 2"), PDCP may be configured as LTE PDCP and may be changed to NR PDCP using an additional reconfiguration message before sending of a security mode command.

In some embodiments, option 1 may require that the eNB 104 supporting EN-DC has to know whether the UE 102 supports EN-DC. The eNB 104 may know the UE capability and may configure PDCP type for SRB2 based on the UE capability. However, SRB1 may require additional signaling in Msg3 (either via RRC signaling or MAC CE signaling) to indicate the UE capability to perform EN-DC and/or split SRB.

In some embodiments, for option 2, the eNB 104 may configure PDCP type for the MCG SRB as LTE PDCP. Hence there may not necessarily be a requirement for the eNB 104 to know the UE split SRB capability when the SRB1 is established. There are many sub-options to do this. One sub-option is performance of intra-cell HO. Only when the MCG SRB is changed to MCG SRB split that it would be changed to NR PDCP. Since the main purpose of MCG SRB split is to improve reliability at the cell edge where NR cells exists, it may not be a frequent event.

Another alternative is for the network to handle this as an implementation option for SRB1. The network may perform the reconfiguration from LTE PDCP to NR PDCP for the MCG SRB as follows. For the downlink, the network may ensure that RRC Connection Reconfiguration is the last message with LTE PDCP and that no new messages are sent until it receives an RRC reconfiguration complete message. For the uplink, the network may have to reconfigure LTE PDCP to NR PDCP in the first reconfiguration message so that the UE 102 will not generate any unsolicited UL message (such as a measurement report and/or other) during the LTE to NR PDCP reconfiguration. This may be performed, in some embodiments, even if the SRB is not changed to split SRB. Embodiments are not limited to the particular messages described above, such as RRC connection reconfiguration and/or RRC reconfiguration complete. Any suitable message(s) may be used, including but not limited to other RRC messages, in some embodiments.

In some cases, with the above options, there is a potential for ambiguity if the UE 102 needs to send any UL unsolicited messages before the Reconfiguration message to switch the UE 102 to NR PDCP. It should be noted that the solution that is proposed for MCG DRB may not be suitable, in some cases, for the reconfiguration of the LTE PDCP to NR PDCP for the MCG SRB as there may be loss of RRC messages due to the discard of MAC SDU in the MAC layer that is not re-transmitted by RLC.

Figure 8:
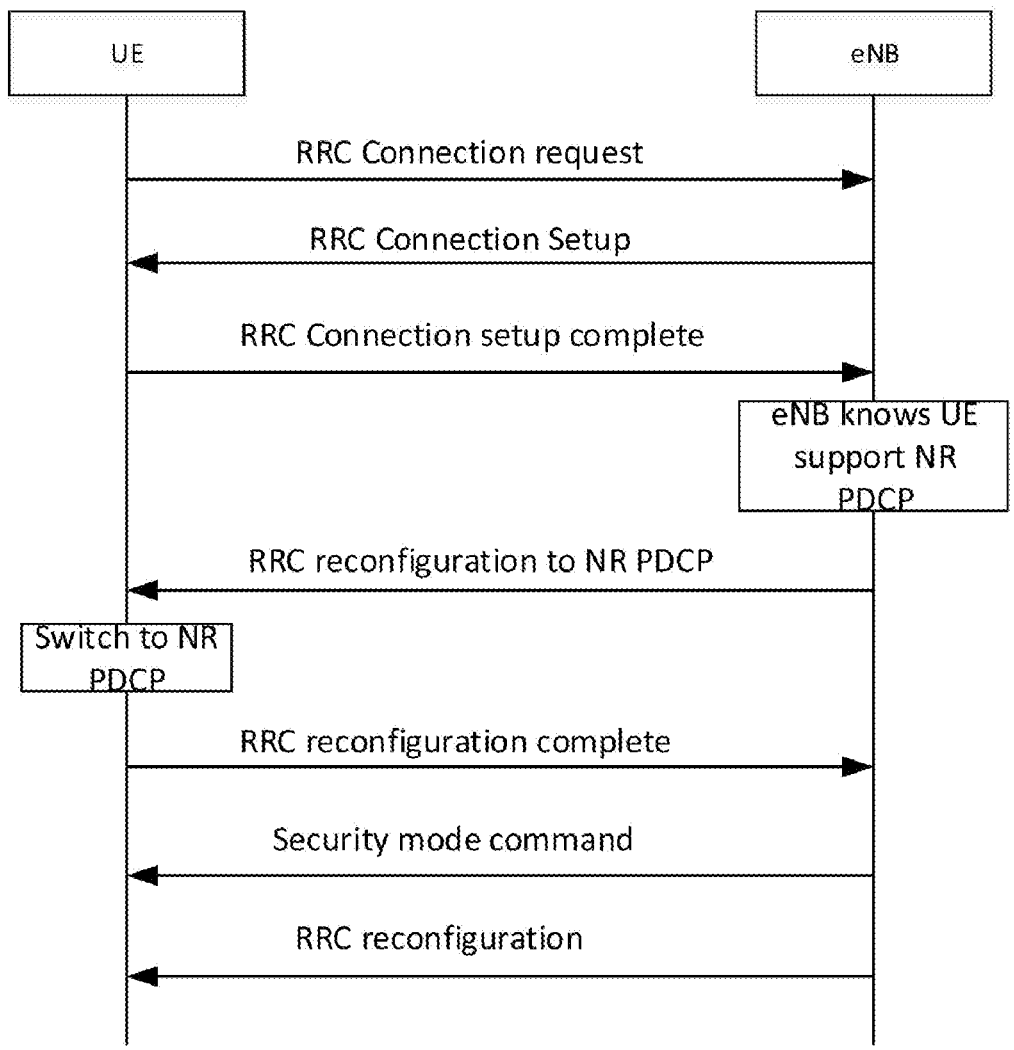
FIG. 8 illustrates example operations and elements that may be exchanged in accordance with some embodiments.

In some embodiments, a default mechanism 800 shown in FIG. 8 may be used.

Figure 9:
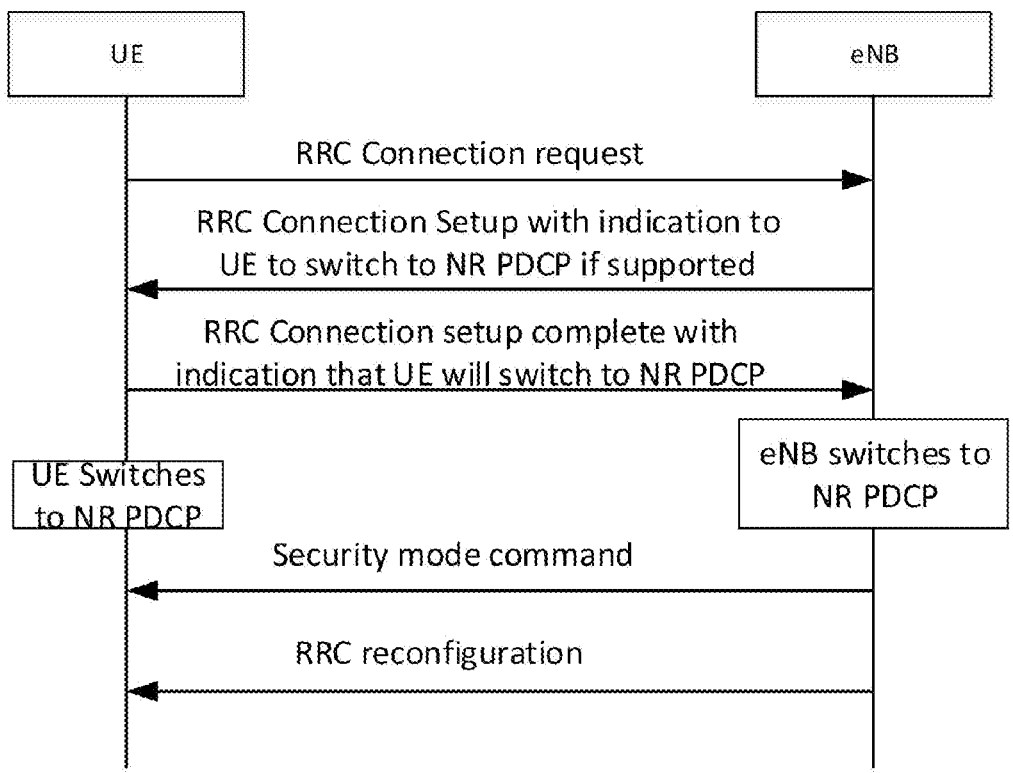
FIG. 9 illustrates example operations and elements that may be exchanged in accordance with some embodiments.

In some embodiments, the UE 102 may be provided with an indication to use NR PDCP, if supported, in msg 4 or in RAR or by broadcast. If the UE 102 supports NR PDCP, the UE 102 may provide an indication in msg 5 that it will switch to NR PDCP. If the decision is to switch to NR PDCP, the UE 102 may do this after sending message 5 (including but not limited to immediately after sending message 5). The network, upon receipt and/or after receipt of msg 5, may update its configuration to NR PDCP (if set by the UE 102 in msg 4) and may use it for some or all subsequent UL and DL messages. This is shown in FIG. 9.

Figure 10:
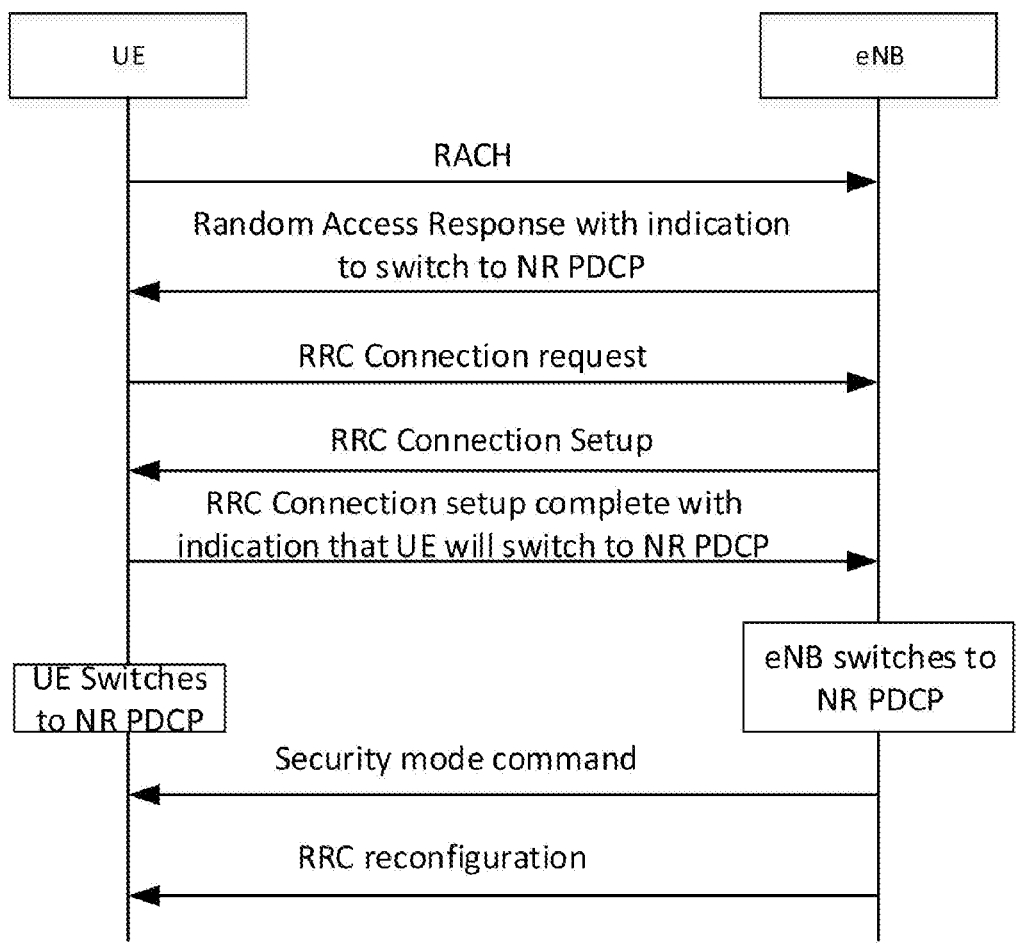
FIG. 10 illustrates example operations and elements that may be exchanged in accordance with some embodiments.

In some embodiments, the indication to the UE 102 to switch to NR PDCP may be provided in an RAR (Random Access Response) message. This is illustrated in FIG. 10.

Figure 11:
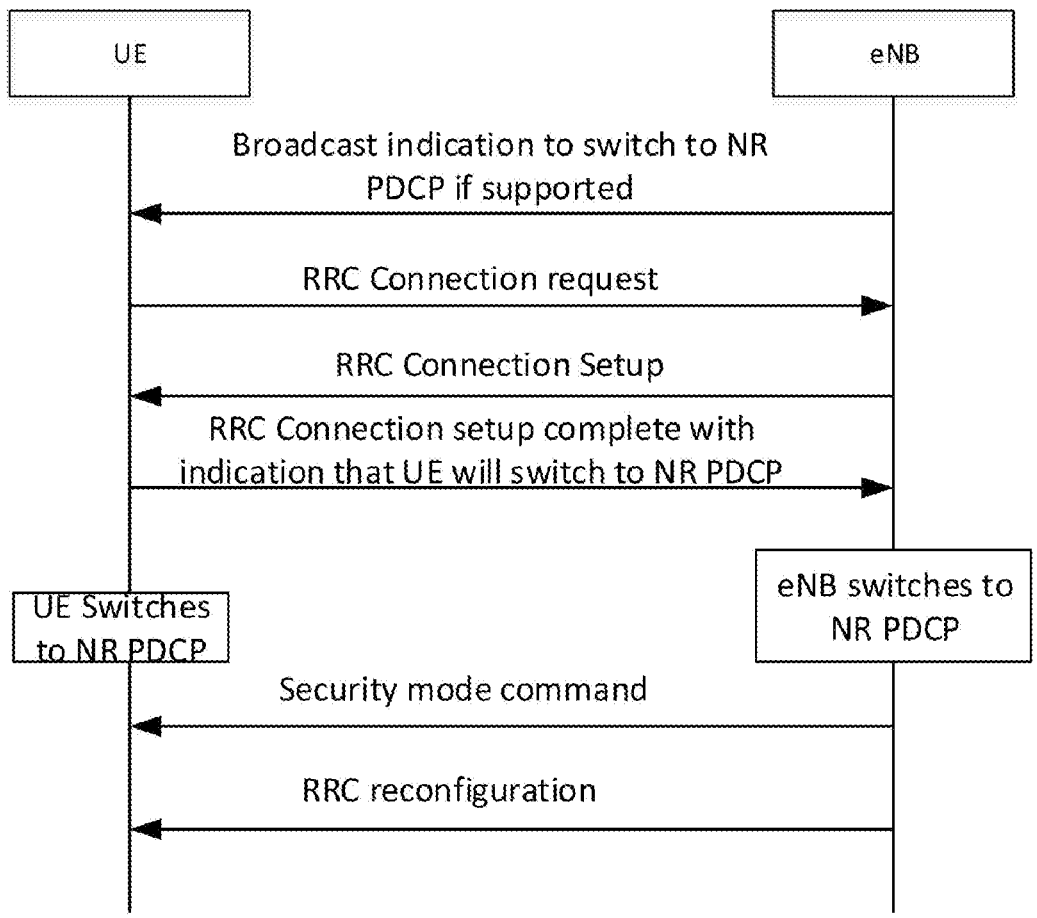
FIG. 11 illustrates example operations and elements that may be exchanged in accordance with some embodiments.

In some embodiments, the indication to the UE 102 to switch to NR PDCP may be provided by broadcast information. This could also be the bit to indicate 5G display in devices that is broadcast. This is shown in FIG. 11.

In some embodiments, a system may support LTE and NR PDCP versions by a UE 102 and by a network. The UE 102 may switch to NR PDCP based on network control. The network and UE 102 may not necessarily have knowledge of UE capabilities and/or network capabilities during the connection setup procedure. The network may provide an indication to the UE 102 to switch to NR PDCP if supported. The UE 102 may provide an indication that it will switch to NR PDCP. The network and the UE 102 may switch to NR PDCP.

In some embodiments, the network may provide the indication to the UE 102 in an RRC connection setup message. In some embodiments, the UE 102 may provide the indication to the network in an RRC Connection setup complete message. In some embodiments, the UE 102 may switch to NR PDCP immediately after transfer of RRC setup complete and the network may switch to NR PDCP after receipt of RRC setup complete and exchanges subsequent messages using NR PDCP. In some embodiments, the indication to the UE 102 may be given in a broadcast message. In some embodiments, a 5G display indication in a broadcast message may be used for this purpose. In some embodiments, the indication may be carried in a random access response message. In some embodiments, the switching may be applicable for SRB1. In some embodiments, the switching may be applicable for SRB2 and/or other radio bearers. In some embodiments, the system may be LTE connected to EPC. In some embodiments, the system may be LTE or NR connected to 5GC. In some embodiments, a UE capability to support NR PDCP for SRB1 may be based on support of split SRB and not necessarily for all cases of support of EN-DC.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE), the apparatus comprising:
processing circuitry; and memory, wherein the UE is configurable by the processing circuitry for communicating using a Long-Term Evolution (LTE) packet data convergence protocol (PDCP) (LTE PDCP) and is also configurable by the processing circuitry for communicating using a Fifth Generation (5G) New-Radio (NR) PDCP (NR PDCP),
wherein the processing circuitry is configured to:
decode a System Information Block Type 1 (SIB1) received from a next-generation Node-B (gNB), the SIB1 including a Public Land Mobile Network (PLMN) identity, the PLMN identity identifying a 5G core network (5GC);
encode a radio resource control (RRC) setup request message on a Signalling Radio Bearer zero (SRB0) to establish an RRC connection on a Signalling Radio Bearer one (SRB1);
wherein if upper layers provided a 5G shortened temporary mobile subscriber identity (5G-S-TMSI), the RRC setup request message is encoded to set a ue-identity to a next-generation (ng) 5G-S-TMSI-part 1 (ng-5G-S-TMSI-part 1), and
wherein if the upper layers did not provide the 5G-S-TMSI, the RRC setup request message is encoded to set the ue-identity to a random value within a predetermined range,
encode an RRC setup complete message for transmission on the SRB1 in response to an RRC setup message received from the gNB;
wherein if the RRC setup message indicated a packet data convergence protocol (PDCP) configuration, the processing circuitry is configured to encode the RRC setup complete message for transmission on the SRB1 using the indicated PDCP configuration, and
wherein if the RRC setup message did not indicate the PDCP configuration, the processing circuitry is configured to encode the RRC setup complete message for transmission on the SRB1 using a default PDCP configuration, and
store the SIB1 in the memory.

2. The apparatus of claim 1 wherein if the upper layers provided the 5G-S-TMSI, the RRC setup request message is further encoded to set an establishment clause in accordance with information received from the upper layers indicating that the UE supports 5GC operation.

3. The apparatus of claim 2, wherein for the RRC setup complete message and for messages subsequent to the RRC setup complete message received and sent by the UE, the processing circuitry is configured to:
apply integrity protection and ciphering in accordance with the NR PDCP if the UE is connected with E-UTRA NR Dual Connectivity (EN-DC); and
apply integrity protection and ciphering in accordance with the LTE PCDP if the UE is not connected with EN-DC.

4. The apparatus of claim 3, wherein if the UE supports connecting with E-UTRA NR Dual Connectivity (EN-DC), the UE is configured to connect to an evolved packet core (EPC) using the EN-DC.

5. The apparatus of claim 1, wherein the PDCP configuration comprises a t-reordering timer value.

6. The apparatus of claim 1, wherein the RRC setup complete message is encoded to include the PLMN identity from the SIB1.

7. The apparatus of claim 1 wherein the upper layers are configured to provide the 5G-S-TMSI when the PLMN identity in the SIB1 identifies a cell connected to the 5GC.

8. The apparatus of claim 2, wherein for the RRC setup complete message sent by the UE on the SRB1 and for messages subsequent to the RRC setup complete message received and sent by the UE on other signalling radio bearers and data radio bearers (DRBs), the processing circuitry is configured to:

apply integrity protection and ciphering in accordance with the NR PDCP if the UE is connected with E-UTRA NR Dual Connectivity (EN-DC); and apply integrity protection and ciphering in accordance with the LTE PCDP if the UE is not connected with EN-DC.

9. The apparatus of claim 1 wherein the processing circuitry comprises a baseband processor.

10. The apparatus of claim 9 where the baseband processor is configured to encode the RRC setup request message for transmission through two or more antennas.

11. A non-transitory computer-readable storage medium that stores instructions for execution by processing circuitry for a user equipment (UE) to configure the UE to:

decode a System Information Block Type 1 (SIB1) received from a next-generation Node-B (gNB), the SIB1 including a Public Land Mobile Network (PLMN) identity, the PLMN identity identifying a 5G core network (5GC);

encode a radio resource control (RRC) setup request message on a Signalling Radio Bearer zero (SRB0) to establish an RRC connection on a Signalling Radio Bearer one (SRB1);

wherein if upper layers provided a 5G shortened temporary mobile subscriber identity (5G-S-TMSI), the RRC setup request message is encoded to set a ue-identity to a next-generation (ng) 5G-S-TMSI-part 1 (ng-5G-S-TMSI-part 1), and wherein if the upper layers did not provide the 5G-S-TMSI, the RRC setup request message is encoded to set the ue-identity to a random value within a predetermined range, encode an RRC setup complete message for transmission on the SRB1 in response to an RRC setup message received from the gNB;

wherein if the RRC setup message indicated a packet data convergence protocol (PDCP) configuration, the processing circuitry is configured to encode the RRC setup complete message for transmission on the SRB1 using the indicated PDCP configuration, and wherein if the RRC setup message did not indicate the PDCP configuration, the processing circuitry is configured to encode the RRC setup complete message for transmission on the SRB1 using a default PDCP configuration.

12. The non-transitory computer-readable storage medium of claim 11 wherein if the upper layers provided the 5G-S-TMSI, the RRC setup request message is further encoded to set an establishment clause in accordance with information received from the upper layers indicating that the UE supports 5GC operation.

13. The non-transitory computer-readable storage medium of claim 12, wherein for the RRC setup complete message and for messages subsequent to the RRC setup complete message received and sent by the UE, the processing circuitry is configured to:

apply integrity protection and ciphering in accordance with the NR PDCP if the UE is connected with E-UTRA NR Dual Connectivity (EN-DC); and apply integrity protection and ciphering in accordance with the LTE PCDP if the UE is not connected with EN-DC.

14. The non-transitory computer-readable storage medium of claim 13, wherein if the UE supports connecting with E-UTRA NR Dual Connectivity (EN-DC), the UE is configured to connect to an evolved packet core (EPC) using the EN-DC.

15. The non-transitory computer-readable storage medium of claim 11, wherein the PDCP configuration comprises a t-reordering timer value.

16. The non-transitory computer-readable storage medium of claim 11, wherein the RRC setup complete message is encoded to include the PLMN identity from the SIB1, and wherein the upper layers are configured to provide the 5G-S-TMSI when the PLMN identity in the SIB1 identifies a cell connected to the 5GC.

17. An apparatus for a next-generation Node-B (gNB), the apparatus comprising:

processing circuitry; and memory, wherein the gNB is configurable by the processing circuitry for communicating using a Long-Term Evolution (LTE) packet data convergence protocol (PDCP) (LTE PDCP) and is also configurable by the processing circuitry for communicating using a Fifth Generation (5G) New-Radio (NR) PDCP (NR PDCP), wherein the processing circuitry is configured to:

encode a System Information Block Type 1 (SIB1) for transmission, the SIB1 including a Public Land Mobile Network (PLMN) identity, the PLMN identity identifying a 5G core network (5GC);

decode a radio resource control (RRC) setup request message received from a user equipment (UE) on a Signalling Radio Bearer zero (SRB0) to establish an RRC connection on a Signalling Radio Bearer one (SRB1);

wherein the RRC setup request message includes a ue-identity set to a next-generation (ng) 5G-S-TMSI-part 1 (ng-5G-S-TMSI-part 1) indicating that the UE has 5GC capability, and wherein the RRC setup request message includes the ue-identity set to a random value within a predetermined range indicating that the UE does not have 5GC capability, decode an RRC setup complete message received from the UE on the SRB1 in response to an RRC setup message sent from the gNB, wherein the processing circuitry is configured to encode the RRC setup message to indicate a packet data convergence protocol (PDCP) configuration for use by the UE for encoding the RRC setup complete message for transmission on the SRB1 using the indicated PDCP configuration, and wherein the processing circuitry is configured to refrain from including the PDCP configuration in the RRC setup message to indicate to the UE to use a default PDCP configuration for the SRB1, and store the SIB1 in the memory.

18. The apparatus of claim 17 wherein if the ue-identity is set to the 5G-S-TMSI-part 1, the RRC setup request message includes an establishment clause that is set to indicate that the UE supports 5GC operation.

19. The apparatus of claim 18, wherein for the RRC setup complete message and for messages subsequent to the RRC setup complete message received and sent by the UE, the processing circuitry of the gNB is configured to:

apply integrity protection and ciphering in accordance with the NR PDCP if the UE is connected with E-UTRA NR Dual Connectivity (EN-DC); and apply integrity protection and ciphering in accordance with the LTE PCDP if the UE is not connected with EN-DC.

20. The apparatus of claim 19, wherein if the UE supports connecting with E-UTRA NR Dual Connectivity (EN-DC), the processing circuitry of the gNB is configured to connect the UE to an evolved packet core (EPC) using the EN-DC.

* * * * *